(No Model.)
L. DURAND.
Dough Kneaders.
No. 228,739.  Patented June 15, 1880.
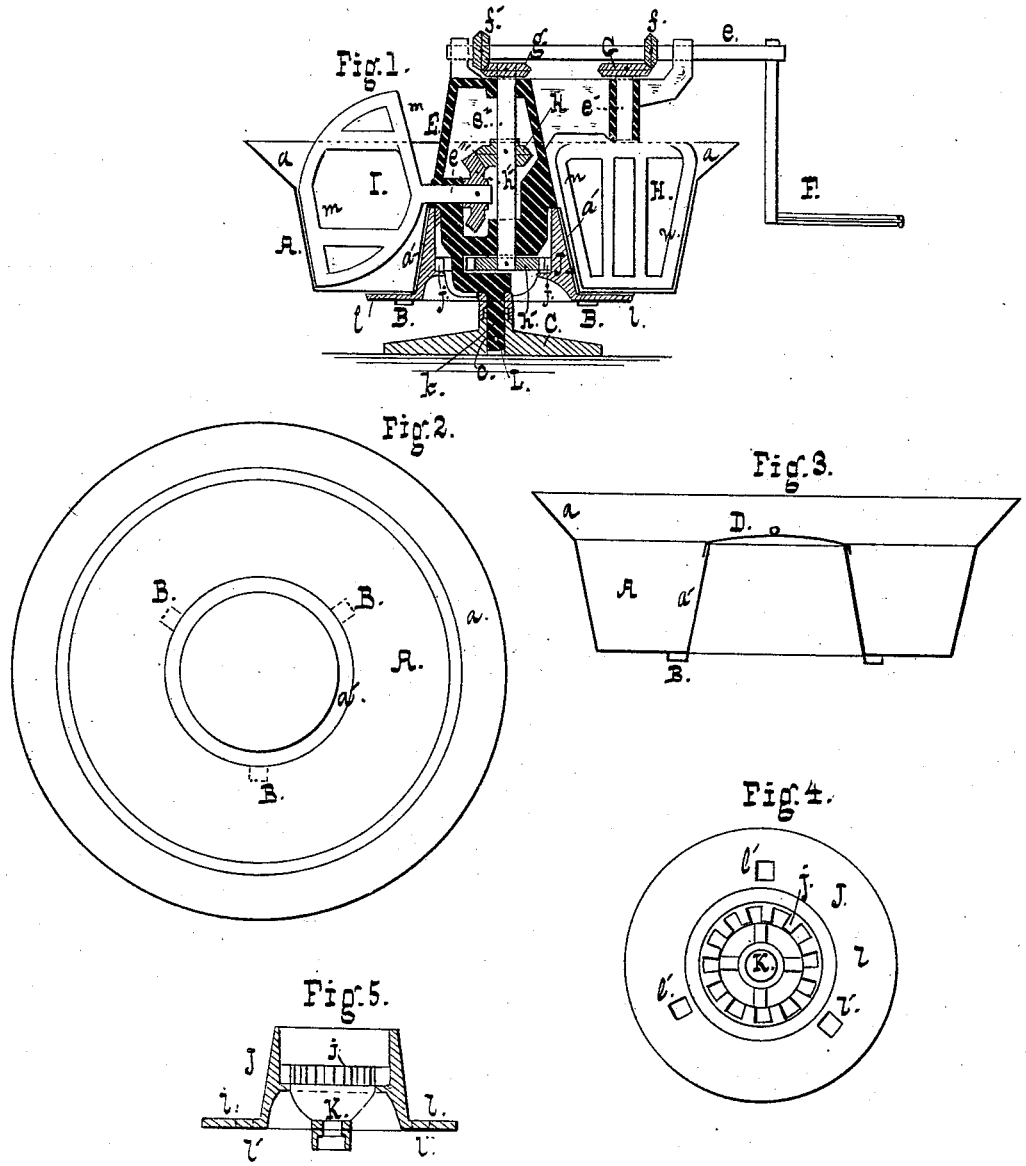

UNITED STATES PATENT OFFICE.

LOUIS DURAND, OF QUEBEC, QUEBEC, CANADA.

DOUGH-KNEADER.

SPECIFICATION forming part of Letters Patent No. 228,739, dated June 15, 1880.

Application filed March 26, 1880. (No model.)

*To all whom it may concern:*

Be it known that I, LOUIS DURAND, of Quebec, in the Province of Quebec, Dominion of Canada, have invented certain new and useful Improvements in Dough-Kneaders; and I hereby declare the same to be fully, clearly, and exactly described as follows, reference being had to the accompanying drawings, in which—

Figure 1 is a central vertical sectional view of the device; Fig. 2, a plan view of the pan; Fig. 3, a central sectional view of the latter; Fig. 4, a plan view of the device for revolving the pan; Fig. 5, a section of the same.

My invention has reference to devices for kneading dough; and it consists in certain improvements upon the apparatus for which Letters Patent were granted me February 12, 1878, No. 200,183.

The object of my present invention is to adapt the patented device for ordinary household use, to simplify and improve the kneading mechanism proper, and to render the entire system of moving parts, as a whole, readily removable from the pan, all as hereinafter set forth.

In the accompanying drawings, A is the pan, having a flaring rim, $a$, to prevent the dough from falling over the edge, and provided with a central cone, $a'$. On the under side of the pan are secured lugs B B B, whose function will be hereinafter explained.

D is a cover adapted to fit over the central opening in the pan, as shown. C is a stand designed to be screwed or otherwise suitably secured to a table or support, and is provided with a step, $c$.

E is a casting having bearings for the shafts $e$ $e'$ $e''$ $e'''$. The former is provided with a crank, F, and carries gear-wheels $f$ $f'$. The wheel $f$ meshes with a similar wheel, G, on the shaft $e'$, to which latter is affixed the fork H. The wheel $f'$ communicates motion to the shaft $e''$, through the medium of the wheel $g$, as shown, and on the shaft $e''$ are keyed two other wheels, $h$ $h'$.

The wheel $h$ meshes with the wheel $h''$ on the shaft $e'''$, which latter carries the beater I, and the wheel $h'$ communicates motion to the pan-driver J. The latter is furnished with an internal gearing, $j$, which engages with the teeth of the wheel $h'$, and is externally of a shape and size to fit within the cone $a'$ of the pan. It is provided with a bearing, K, through which the center-pin, $k$, of the casting E passes. The pin is stepped in the stand C, and is secured therein by a pin, L.

The flange $l$ of the driver J supports the pan, and is slotted at $l'$ to accommodate the lugs B B. The opposite edges $m$ $m$ of the beater I and those, $n$ $n$, of the fork are of such shape that they revolve close to the annular walls of the pan without actually coming in contact with them.

The operation of the device is as follows: The flour and water to be mixed and kneaded, or the sponge to be worked, is placed in the pan, which is mounted on the driver J, the lugs of the pan entering slots in the driver. The pin $k$ of the casting E is then inserted through the central aperture in the driver J and secured in the stand C. Upon turning the crank, motion is communicated, through the systems of gearing, to the fork H and beater I, while the pan itself is made to revolve by means of the wheel $h'$ and driver J. The dough is thereby thoroughly mixed and kneaded, and when the operation is complete the pin L is taken out, and the entire system of moving parts is removed. The cover D is finally placed on the central opening of the pan, and the contents of the same are removed, the cover serving to prevent any of the dough from falling through the opening.

While in the accompanying drawings I have shown but a single beater and fork attached to the casting E, it is obvious that they may be multiplied, if desired.

What I claim is—

In combination with the center shaft and wheel, $h'$, mounted, as described, in the piece E, the driver J, having teeth on its interior, and a circumferential flange, upon which the pan A rests, as set forth.

LOUIS DURAND.

Witnesses:
E. D. DEGROOT,
JOS. C. HUGHES.